(12) United States Patent
Nishishita (10) Patent No.: US 6,658,957 B2
(45) Date of Patent: Dec. 9, 2003

(54) LINK MECHANISM

(75) Inventor: Masato Nishishita, Kariya (JP)

(73) Assignee: Denso Corporation, Kariya (JP)

( * ) Notice: Subject to any disclaimer, the term of this patent is extended or adjusted under 35 U.S.C. 154(b) by 53 days.

(21) Appl. No.: 10/047,700

(22) Filed: Jan. 15, 2002

(65) Prior Publication Data

US 2002/0108460 A1 Aug. 15, 2002

(30) Foreign Application Priority Data

Jan. 18, 2001 (JP) ........................................ 2001-010680

(51) Int. Cl.[7] ................................................ G05G 1/00
(52) U.S. Cl. .............................. 74/469; 74/567; 74/48
(58) Field of Search .......................... 74/469, 55, 47, 74/48, 567, 569

(56) References Cited

U.S. PATENT DOCUMENTS 4,271,710 A * 6/1981 Brems ........................... 74/27
4,924,724 A * 5/1990 Yoshimura ................ 74/473.15
5,040,649 A * 8/1991 Okada ...................... 192/220.1
5,752,096 A * 5/1998 Ichino et al. .................. 396/85

FOREIGN PATENT DOCUMENTS

JP    Y2-1-26494    8/1989

* cited by examiner

Primary Examiner—David Fenstermacher
(74) Attorney, Agent, or Firm—Harness, Dickey & Pierce, PLC (57) ABSTRACT

In a link mechanism, a first link is disposed to be movable by a driving force from a driving source, and a second link is operatively linked with the first link to move a driven unit. One of the first and second links includes a cam groove having a bent portion which is bent by a radius of curvature smaller than a predetermined value, and the other one of the first and second links includes a pin slidable within the cam groove. In the link mechanism, a sliding speed of the pin sliding in the cam groove is reduced when the pin enters into the bent portion in the cam groove, as compared with the sliding speed before the pin enters into the bent portion.

8 Claims, 9 Drawing Sheets

LINK MECHANISM

CROSS-REFERENCE TO RELATED APPLICATION

This application is related to Japanese Patent Application No. 2001-10680 filed on Jan. 18, 2001, the contents of which are hereby incorporated by reference.

BACKGROUND OF THE INVENTION

1. Field of the Invention

The present invention relates to a link mechanism constructed by plural links, which is suitably used for a fluid passage switching device such as an inside/outside air switching device of a vehicle air conditioner.

2. Description of Related Art

In a conventional link mechanism for a fluid passage switching device of a vehicle air conditioner described in JP-Y2-1-26494, a cam groove having a predetermined shape is provided in one side link, and a pin sliding in the cam groove is provided in the other side link, so that driving force of a driving source such as an electrical motor is transmitted to a driven unit. Because ram pressure is applied to the inside/outside air switching device while the vehicle is running, a switching door is need to be pressed to an outside air introduction port while crushing a packing for closing the outside air introduction port. Accordingly, when an area of the outside air introduction port increases, a closing force and a closing amount of the switching door are increased.

On the other hand, in this link mechanism, the cam groove is bent to have a predetermined radius of curvature. However, when the radius of curvature is made smaller in a bent portion of the cam groove, a pin sliding speed increases in the bent portion, and therefore, a relative large collision noise causes when the pin collides with a side surface of the cam groove. Here, a shock absorbing mechanism (buffer mechanism) may be provided in a collision position within the cam groove. However, in this case, the shape of the cam groove becomes complex, and a product cost of the cam groove increases.

SUMMARY OF THE INVENTION

In view of the foregoing problems, it is an object of the present invention to provide a link mechanism which reduces a noise due to a collision between a pin and a side wall defining a cam groove, while a product cost of the cam groove is restricted.

According to the present invention, in a link mechanism for transmitting a driving force from a driving source to a driven unit, a first link is disposed to be movable by the driving force from the driving source, a second link is operatively linked with the first link in a connection portion to move the driven unit. In the connection portion, one of the first link and the second link includes a first cam groove having a bent portion which is bent by a radius of curvature smaller than a predetermined value, and the other one of the first link and the second link includes a first pin slidable within the first cam groove. In the link mechanism, the first pin is disposed to be slidable in the first cam groove with a sliding speed, the sliding speed of the first pin is set lower when the first pin slides within the first cam groove by a predetermined amount, as compared with the sliding speed before the first pin slides in the first cam groove by the predetermined amount. Accordingly, a collision energy between the first pin and a side wall defining the first cam groove can be made smaller without providing a shock-absorbing mechanism in the first cam groove. Therefore, a collision noise due to a collision between the first pin and the side wall of the first cam groove can be reduced while the first cam groove is manufactured in low cost.

Preferably, the sliding speed of the pin is set lower when the first pin enters into the bent portion, as compared with the sliding speed before the first pin enters into the bent portion. Therefore, the collision energy of the first pin with the side wall of the first cam groove can be made smaller in the bent portion, and the collision noise can be further reduced. Here, the state when the first pin enters into the bent portion includes an approximate twice range of the radius of curvature on an outer side of the bent portion.

The link mechanism includes a third link driven by the driving source to drive the first link, and the third link is operatively linked to the first link. In a connection portion between both the first and third links, one of the first link and the third link includes a second cam groove, and the other one of the first link and the third link includes a second pin slidable within the second cam groove. The second cam groove has first and second operation groove parts in which the first link operates with a rotation of the third link, and an idling groove part positioned between the first and second operation groove parts. The idling groove part has the radius of curvature approximately equal to that of a locus pictured by the second pin between the first and second operation groove parts, and the idling groove part is set to approximately correspond to a timing where the first pin enters into the bent portion. Accordingly, the collision energy between the first pin and the side wall of the first cam groove can be readily made smaller without the shock absorbing mechanism, and the collision noise can be effectively reduced while the link mechanism is manufactured in low cost.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. In this embodiment, a link mechanism according to this invention is typically used for an inside/outside air switching device of a vehicle air conditioner.

Figure 1:
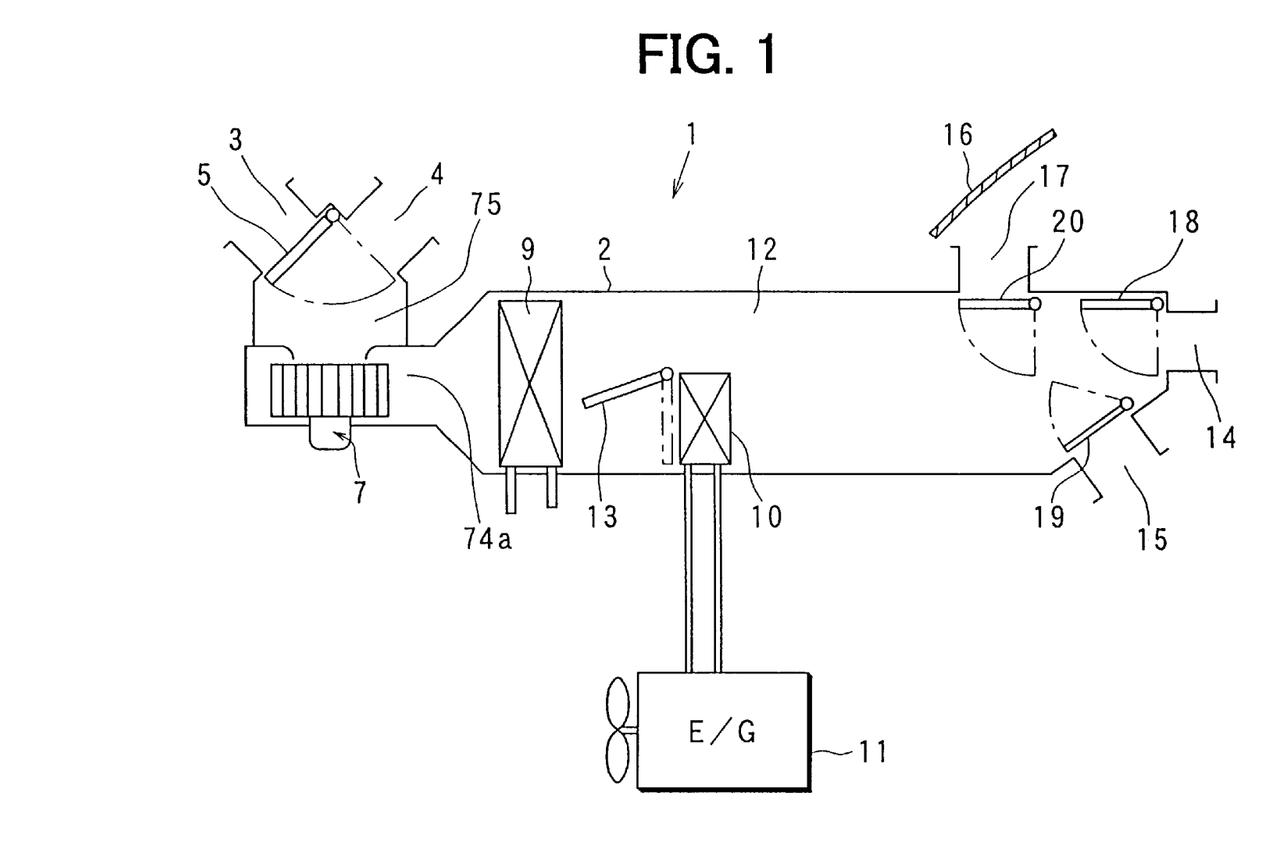
FIG. 1 is a schematic diagram showing a vehicle air conditioner according to a preferred embodiment of the present invention.

As shown in FIG. 1, an air conditioner 1 for a vehicle includes an air conditioning case 2 defining an air passage through which air flows into a passenger compartment of the vehicle. At a most upstream air side, the air conditioning case 2 has an inside air introduction port 3 through which inside air inside the passenger compartment is introduced, and an outside air introduction port 4 through which outside air outside the passenger compartment is introduced. An inside/outside air switching door (driven unit) 5 for selectively opening and closing the inside air introduction port 3 and the outside air introduction port 4 is disposed in the air conditioning case 2. The inside/outside air switching door 5 is opened and closed by an electrical driving source such as a servomotor. Hereinafter, a device, constructed by the inside/outside air switching door 5 and a link mechanism or a servomotor for driving the inside/outside air switching door 5, is referred to as "an inside/outside air switching device".

A centrifugal blower 7 is disposed at a downstream air side of the inside/outside air switching door 5, so that air sucked from both the introduction ports 3, 4 is blown toward air outlets 14, 15, 17 by the blower 7. An evaporator 9 for cooling air is disposed at a downstream air side of the blower 7 so that all air blown by the blower 7 passes through the evaporator 9.

A heater core 10 for heating air is disposed in the air conditioning case 2 at a downstream air side of the evaporator 9. The heater core 10 heats air using cooling water of an engine 11 as a heating source. The heater core 10 is disposed in the air conditioning case 2 to form a bypass passage 12 through which air bypasses the heater core 10. An air mixing door 13 is disposed at an upstream air side of the heater core 10 to adjust a ratio between an air amount passing through the heater core 10 and an air amount passing through the bypass passage 12, so that air blown into the passenger compartment can be adjusted.

At a most downstream air side of the air conditioning case 2, the air outlets 14, 15, 17 are provided. The air outlets 14, 15, 17 include a face air outlet 14 for blowing air toward the upper body of the passenger in the passenger compartment, a foot air outlet 15 for blowing air toward the foot area of the passenger in the passenger compartment, and a defroster air outlet 17 for blowing air toward an inner surface of a front windshield 16.

Mode switching doors 18–20 are disposed in the air conditioning case 2 at upstream air sides of the air outlet ports 14, 15, 17, respectively. Those mode switching doors 18–20 are opened and closed by a driving unit such as a servomotor or by a manual operation.

Figure 2:
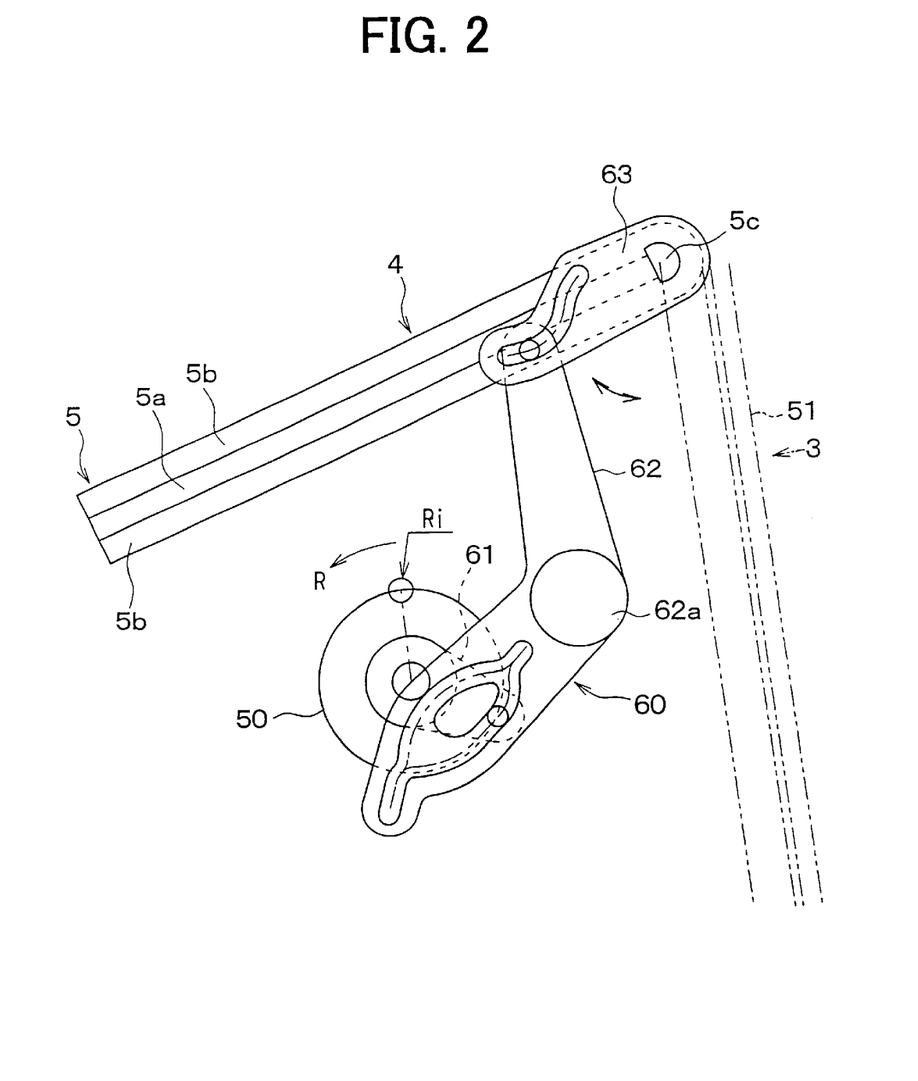
FIG. 2 is schematic side view showing a link mechanism according to this embodiment.

Next, the inside/outside air switching device will be now described. FIG. 2 is a schematic view showing the inside/outside air switching device. The inside/outside air switching door 5 includes a resinous door body 5a for selectively opening and closing the outside air introduction port 4 and the inside air introduction port 3, a packing 5b provided integrally with the outer peripheral end of the door body 5a, and a shaft 5c disposed to move and slide (rotate) the door body 5a.

A servomotor 50 (driving source) is disposed to provide a driving force for sliding the door body 5a of the switching door 5 through a link mechanism 60. A servo lever (third link) 61 is fixed to a rotation shaft of the servomotor 50 to be rotated integrally with the rotation shaft. A sub-link (first link) 62 is formed into an approximate V shape, and is connected to the servo lever 61 to be operatively linked with the rotation of the servo lever 61. The sub-lever 61 is rotatably supported in a casing portion 51 of the inside/outside air switching device at a bent portion 62a of the sub-link 62 bent to the V shape.

A door lever 63 (second link) is fixed to a shaft 5c to be rotated integrally with the shaft 5c, and is connected to the sub-link 62 to move the switching door 5 in accordance with the operation of the sub-link 62. That is, the link mechanism 60 for transmitting a rotation driving force of the servomotor 50 to the switching door 5 is constructed by the door lever 63, the sub-link 62 and the servo lever 61.

Figure 3:
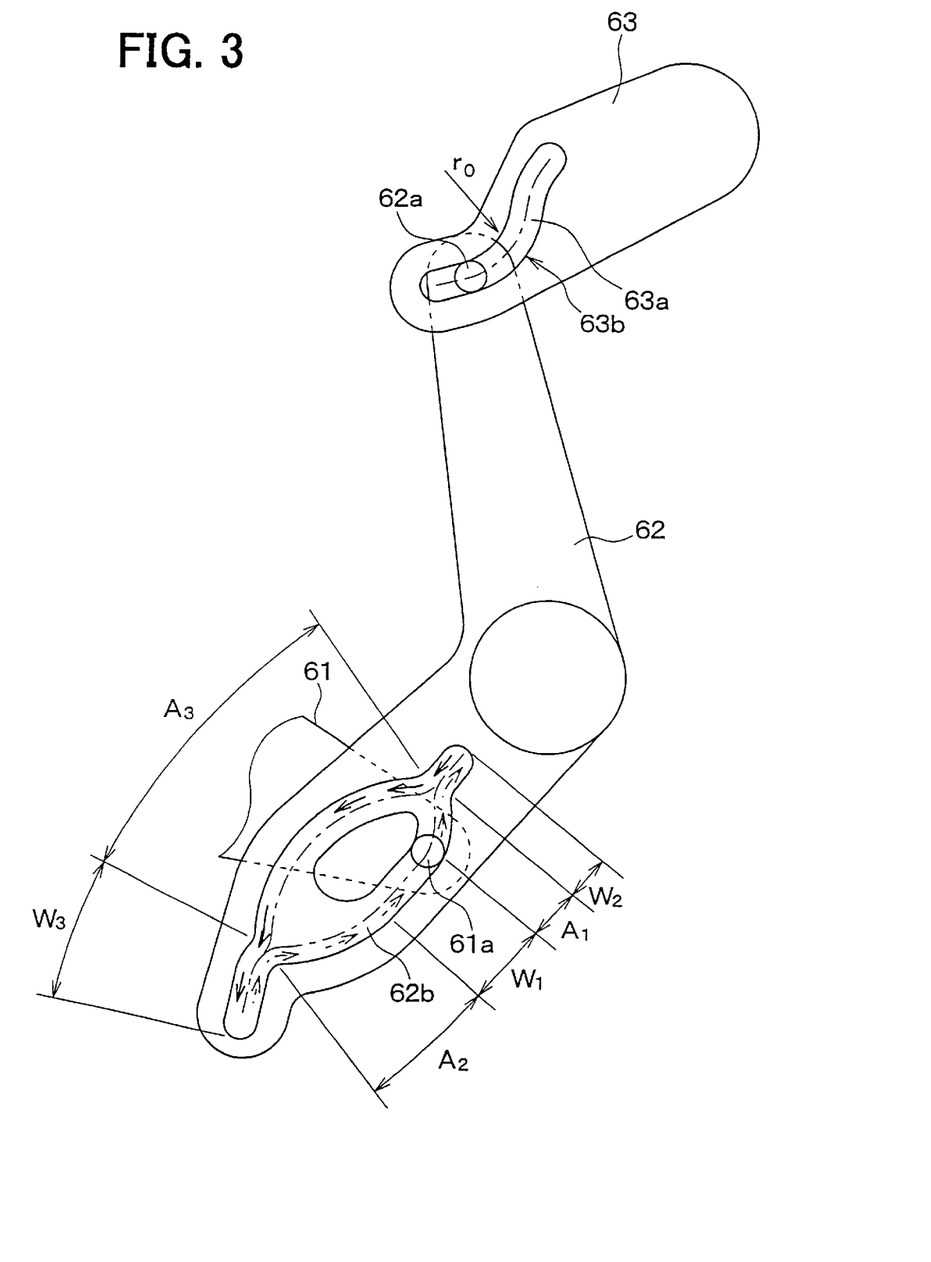
FIG. 3 is an enlarged view showing the link mechanism in FIG. 2.

As shown in FIG. 3, in the connection portion between the sub-link 62 and the door lever 63, a first cam groove 63a and a first pin 62a are provided. The first cam groove 63a bent approximately to an approximate S shape can be provided in one of the sub-link 62 and the door lever 63, and the first pin 62a can be provided in the other one of the sub-link 62 and the door lever 63. In this embodiment, the first cam groove 63a is provided in the door lever 63, and the first pin 62a is provided in the sub-link 62 to be slidable within the first cam groove 63a. The first cam groove 63a has a bent portion 63b with a small radius of curvature.

In a connection portion between the sub-link 62 and the servo lever 61, a second cam groove 62b and a second pin 61a sliding within the second cam groove 62b are provided. The second cam groove 62b having an approximate ring shape can be formed in one of the sub-link 62 and the servo lever 61, and the second pin 61a can be formed in the other one of the sub-link 62 and the servo lever 61. In this embodiment, the second cam groove 62b is provided in the sub-link 62, and the second pin 61a is provided in the servo lever 61.

The second pin 61a slides in the second cam groove 62b only in one direction with the rotation of the servo motor 50. When the second pin 61a slides in a direction shown by the chain-line arrows in FIG. 3, the switching door 5 moves to perform a closing operation of the inside air introduction port 3 from a state where the outside air introduction port 4 is closed (hereinafter, this sliding movement of the pin 61a is referred to as "open operation stroke"). On the other hand, when the second pin 61a slides in a direction shown by the solid-line arrows in FIG. 3, the switching door 5 moves to perform a closing operation of the outside air introduction port 4 from a state where the inside air introduction port 3 is closed (hereinafter, this sliding movement of the pin 61a is referred to as "close operation stroke").

The portion corresponding to the open operation stroke within the second cam groove 62b is constructed to have first and second operation groove parts W1, W2 where the sub-link 62 operates in accordance with the rotation of the servo lever 61, and a first idling groove part A1 having a curvature radius approximately equal to that of a circular arc locus pictured by a center of the second pin 61a. The first idling groove part A1 is positioned between the first and second operation groove parts W1, W2, and the position of the first idling groove part A1 is set to approximately correspond a timing for introducing the first pin 62a into the bent portion 63b.

A second idling groove part A2, having a curvature radius approximately equal to that of a circular arc locus pictured by the center of the second pin 61a, is provided in a back area from the first operation groove part W1 in the sliding direction of the second pin 61a in the open operation stroke.

A third idling groove part A3, having a curvature radius approximately equal to that of the circular arc locus pictured by the center of the second pin 61a, is provided in the close operation stroke. Further, a third operation groove part W3 where the sub-link 62 operates in accordance with the rotation of the servo lever 61 is also provided in the close operation stroke.

Figure 4:
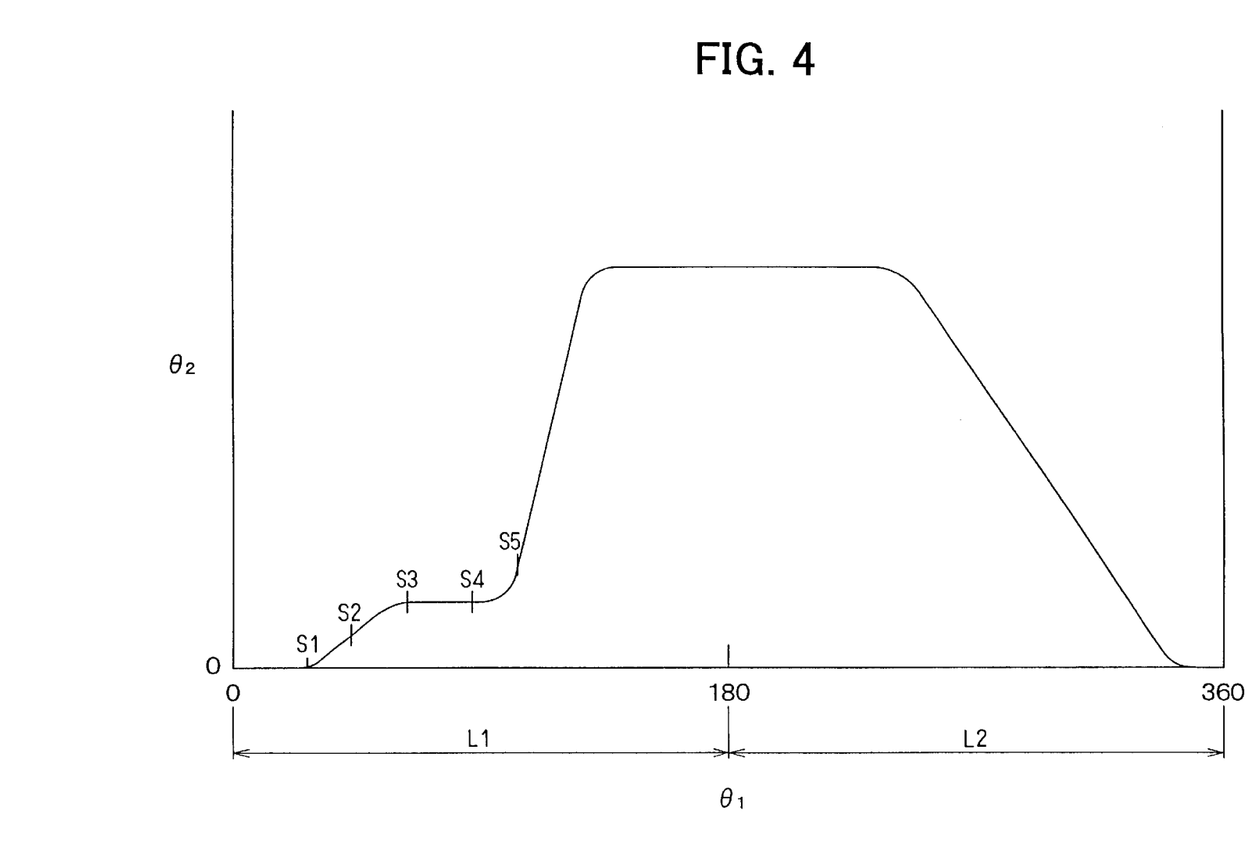
FIG. 4 is a graph showing a relationship between a rotation angle $\theta 1$ of a servomotor and a rotation angle $\theta 2$ of a switching door, according to the embodiment.

Next, operation of the link mechanism 60 of the inside/outside air switching device according to this embodiment will be now described. FIG. 4 shows a relationship between a rotation angle θ1 of the servomotor 50 (servo lever 61) and a rotation angle θ2 of the switching door 5. Here, the rotation angle θ1 of the servomotor 50 (servo lever 61) is a rotation angle relative to an initial position Ri shown in FIG. 2. At the initial position Ri, the outside air introduction port 4 is closed, and the second pin 61a is positioned at an end (i.e., left end in FIG. 2) of the third operation groove part W3. On the other hand, the rotation angle (sliding angle) θ2 of the switching door 5 is an angle detected from a position where the outside air introduction port 4 is closed, to a direction for closing the inside air introduction port 3.

Figure 5:
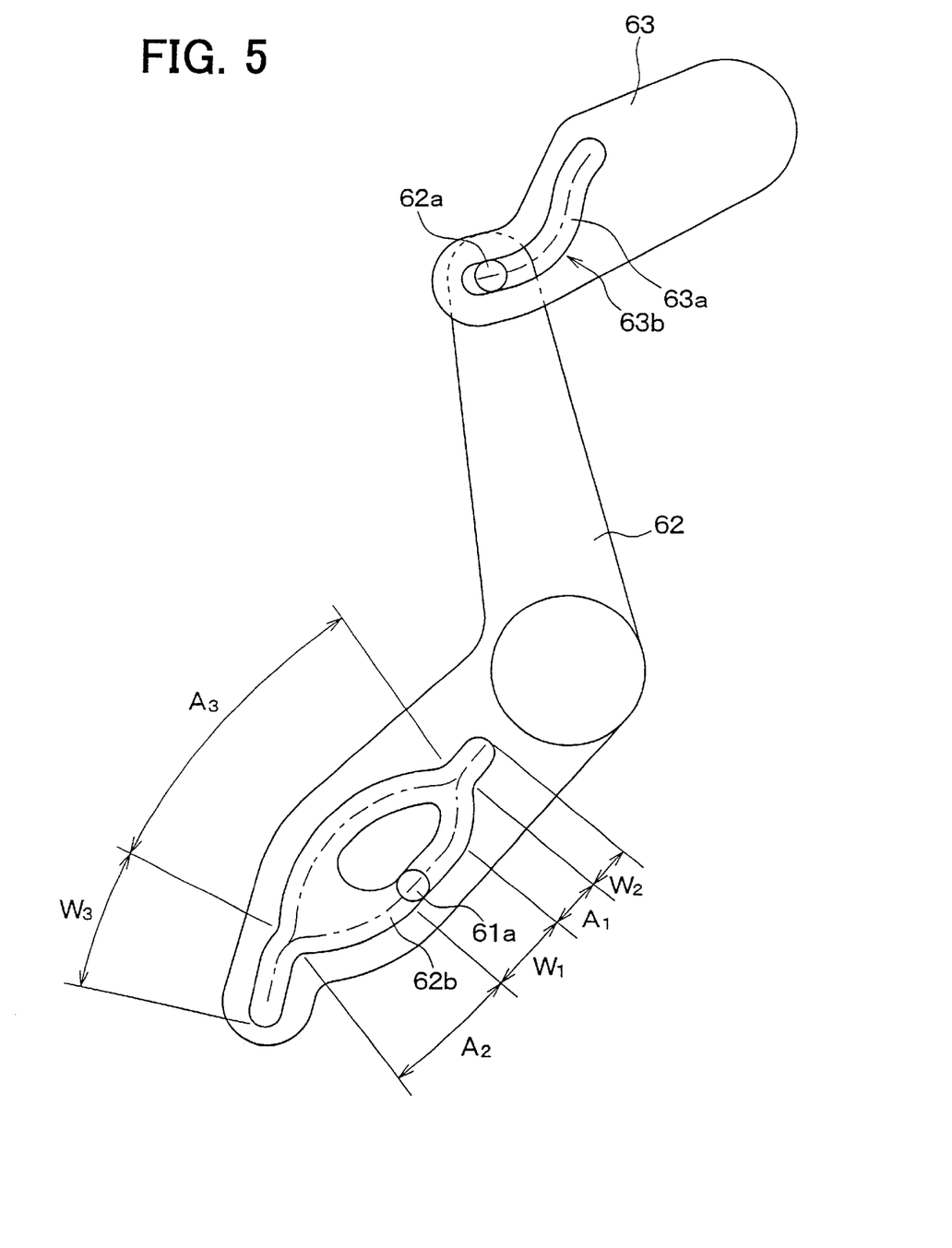
FIG. 5 is a schematic side view showing the link mechanism in a state S1 in FIG. 4.
Figure 6:
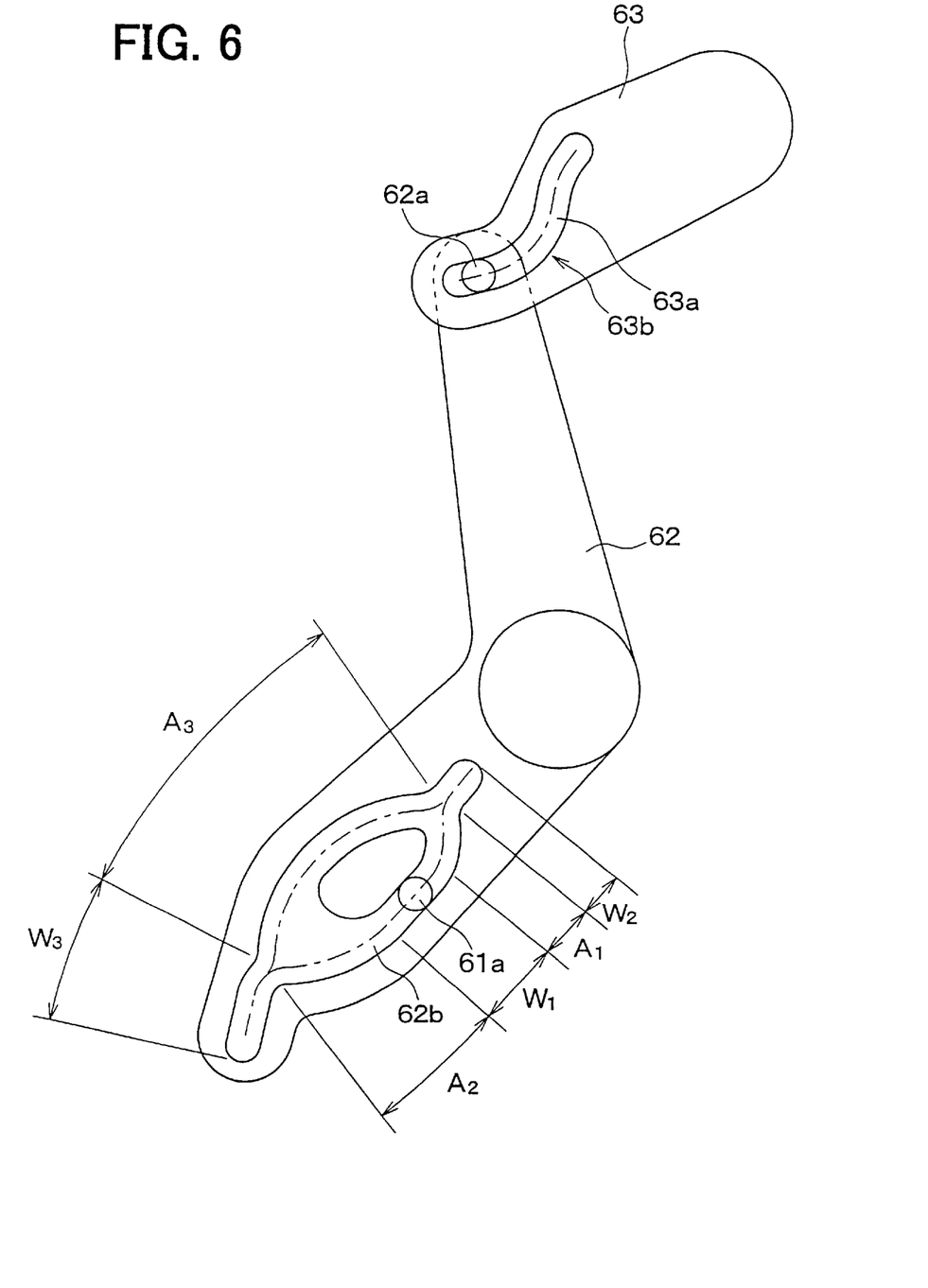
FIG. 6 is a schematic side view showing the link mechanism in a state S2 in FIG. 4.

In FIG. 4, L1 indicates the open operation stroke, and L2 indicates a close operation stroke. FIG. 5 corresponds to the state S1 in FIG. 4, FIG. 6 corresponds to the state S2 in FIG. 4, FIG. 7 corresponds to the state S3 in FIG. 4, FIG. 8 corresponds to the state S4 in FIG. 4, and FIG. 9 corresponds to the state S5 in FIG. 9.

Figure 7:
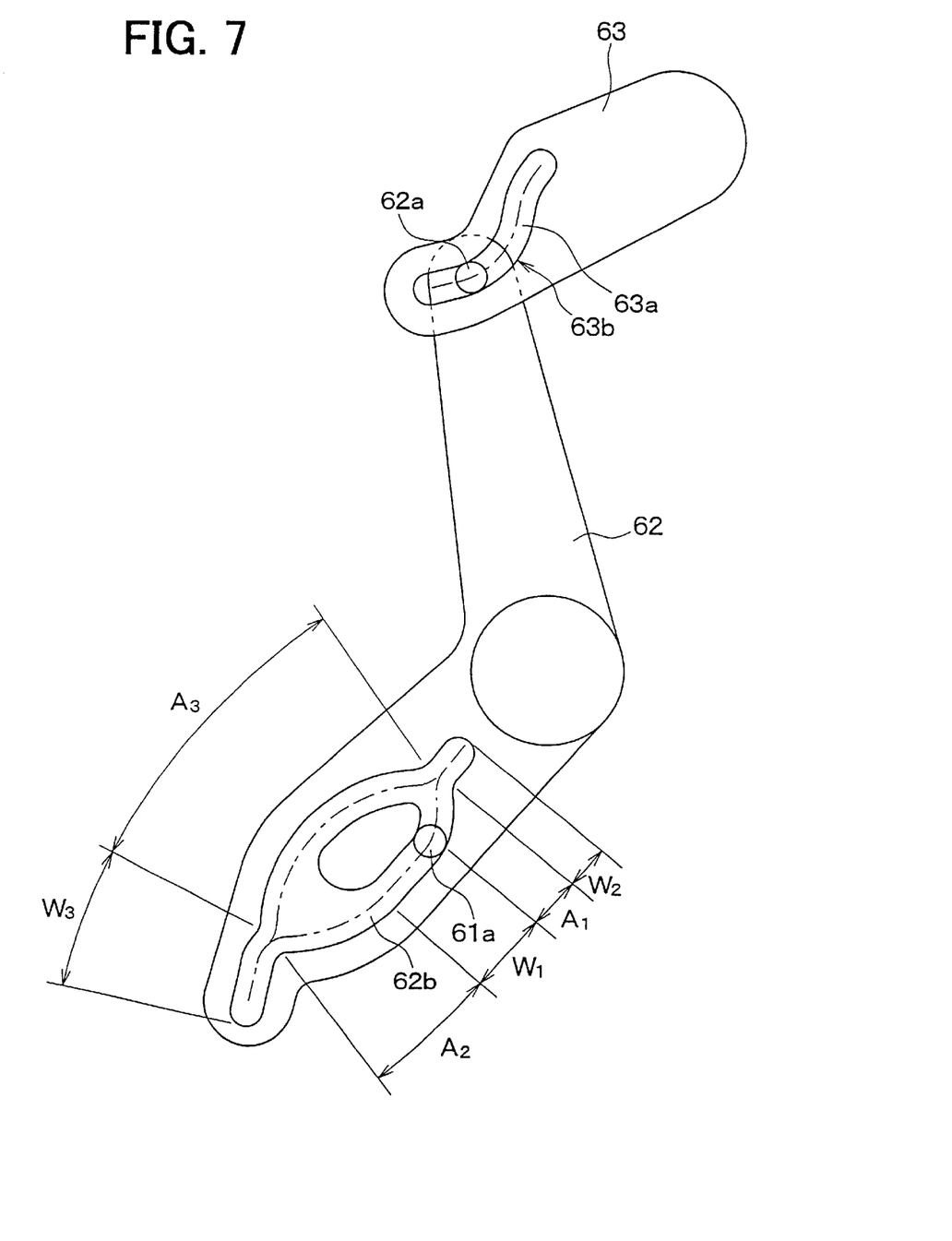
FIG. 7 is a schematic side view showing the link mechanism in a state S3 in FIG. 4.

When the servomotor 50 rotates and the second pin 61a reaches to the first operation groove part W1 as shown in FIG. 5, the sub-link 62 starts operating, and the switching door 5 starts opening the outside air introduction port 4. Thereafter, the second pin 61a reaches to the first idling groove part A1 as shown in FIG. 7. When the second pin 61a reaches to the first idling groove part A1, the sliding speed of the sub-link 62 (switching door 5) greatly decreases, and the operation of the sub-link 62 relative to the rotation of the servomotor 50 (servo lever 61) is substantially stopped. Therefore, as shown in FIG. 4, relative to a change of the rotation angle θ1 of the servomotor 50 (servo lever 61), the rotation angle (sliding angle) θ2 of the switching door 5 changes stepwise.

Because the forming position of the first idling groove part A1 is set to approximately correspond to the timing where the first pin 62a is introduced into the bent portion 63b, the sliding speed of the first pin 62a decreases when the first pin 62a is introduced into the bent portion 63a, as compared with the sliding speed before the first pin 62a is introduced into the bent portion 63b.

Figure 8:
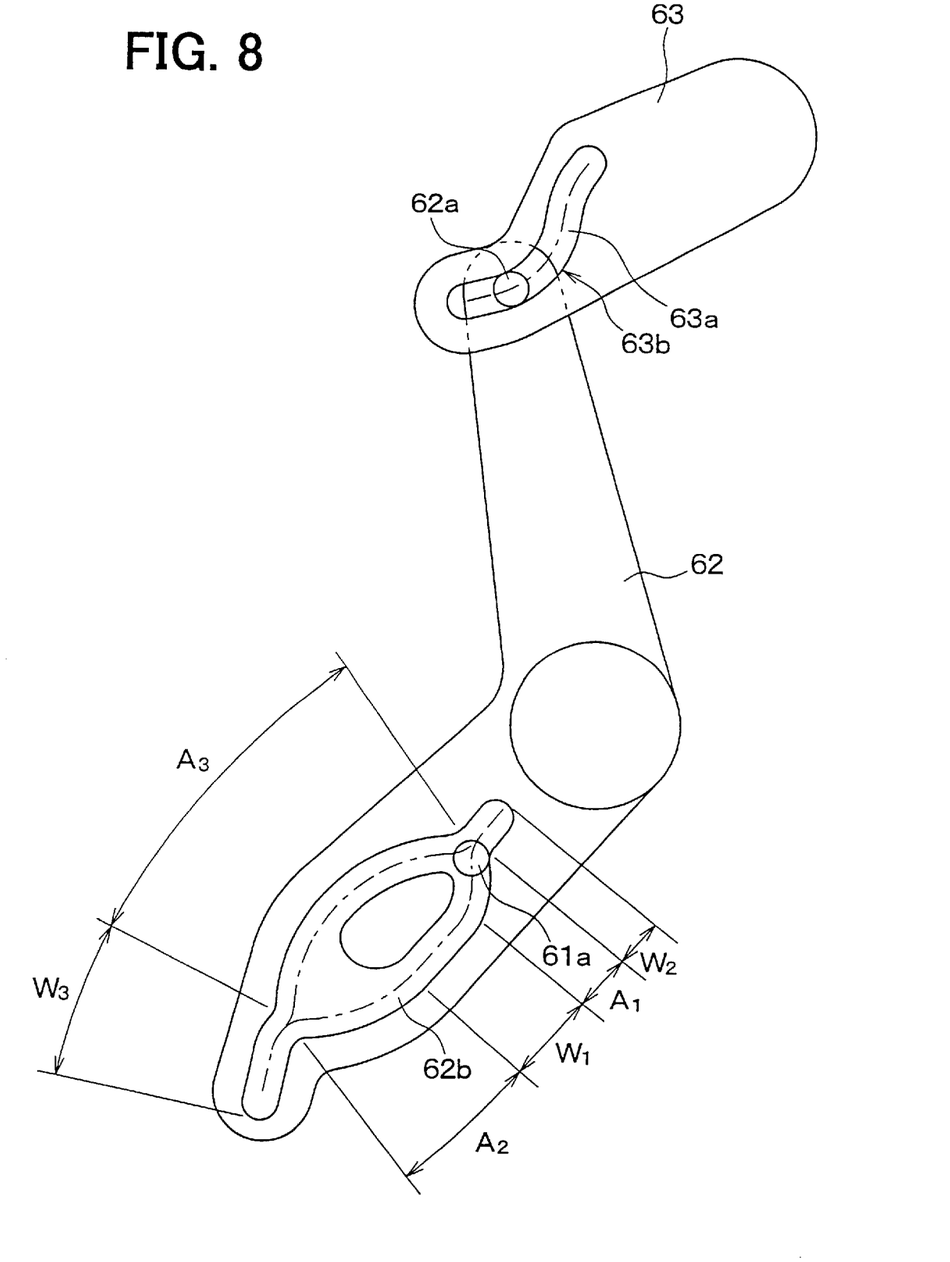
FIG. 8 is a schematic side view showing the link mechanism in a state S4 in FIG. 4.
Figure 9:
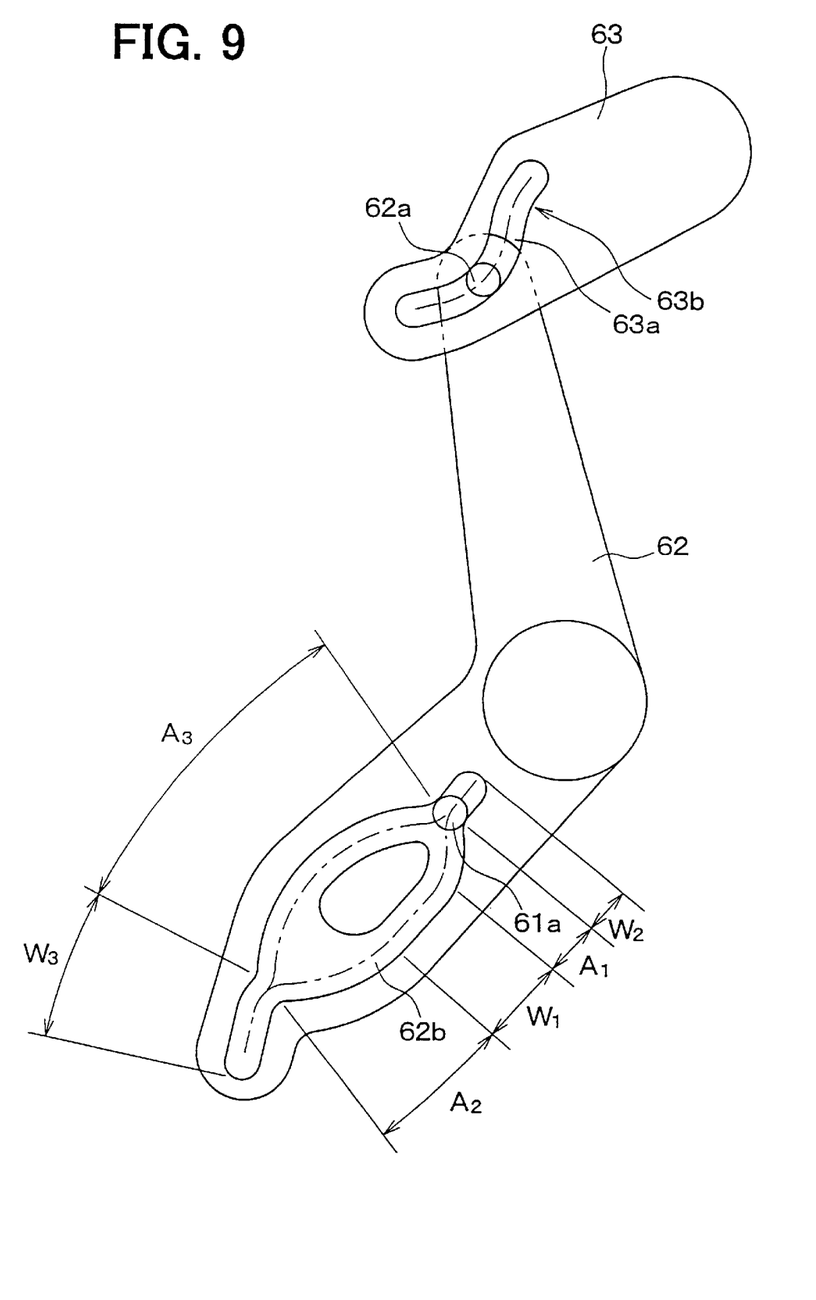
FIG. 9 is a schematic side view showing the link mechanism in a state S5 in FIG. 4.

Thereafter, when the second pin 61a reaches to the second operation groove part W2 as shown in FIG. 8, the sub-link 62 starts again the operation, and the switching door 5 rotates (slides), so that the open operation stroke for opening the outside air introduction port 4 and closing the inside air introduction port 3 is finished. In the open operation stroke, the servomotor 50 (servo lever 61) rotates by 180 degrees.

On the other hand, in the close operation stroke, the operation of the sub-link 62 relative to the rotation of the servomotor 50 (servo lever 61) is substantially stopped only in the third idling groove part A3. Therefore, as shown in FIG. 4, after the second pin 61a reaches to the third operation groove part W3, the switching door 5 starts the sliding movement (rotation) in the direction for closing the outside air introduction port 4.

According to this embodiment of the present invention, the sub-link 62 is operated so that the sliding speed of the first pin 62a decreases when the first pin 62a enters into the bent portion 63b, as compared with that before the first pin 62a enters into the bent portion 63b. Therefore, a collision energy, caused when the first pin 62a collides with a side wall surface defining the first gam groove 63a (bent portion 63b), can be made smaller. Thus, the collision energy of the first pin 62a can be made smaller without providing a shock absorbing member in the first gam groove 63a. As a result, noise, caused due to the collision between the first pin 62a and the side wall surface of the first cam groove 63a, can be reduced.

In this embodiment, the state when the first pin 62a enters into the bent portion 63b includes an approximate twice range of the radius of curvature on an outer side of the bent portion 63b.

In this embodiment, by simply providing the first idling groove part A1 in the second gam groove 62b, the sub-link 62 can be operated so that the sliding speed of the first pin 62a decreases when the first pin 62a enters into the bent portion 63b, as compared with that before the first pin 62a enters into the bent portion 63b. Therefore, the link mechanism 60 can be manufactured in low cost.

According to experiments by the inventors of the present invention, when the radius of curvature of the bent portion 63 becomes larger than a predetermined degree, the collision of the first pin 62a with the side wall surface of the first cam groove 63a becomes difficult. When the curvature radius "ro" shown in FIG. 3 is equal to or smaller than 8 mm, the collision noise becomes remarkably large. Accordingly, when the curvature radius "ro" shown in FIG. 3 is set equal to or smaller than 8 mm, the effect for reducing the collision noise can be effectively improved in the present invention.

For sufficiently reducing the collision energy (collision noise), the sliding speed of the first pin 62a, when the first pin 62a enters into the bent portion 63a, is reduced to approximately half of the sliding speed of the first pin 62a before the first pin 62a enters into the bent portion 63b.

Although the present invention has been fully described in connection with the preferred embodiment thereof with reference to the accompanying drawings, it is to be noted that various changes and modifications will become apparent to those skilled in the art.

For example, in the above-described embodiment, the link mechanism 60 of the present invention is typically used for the inside/outside air switching device. However, the link mechanism of the present invention may be used for a fluid passage switching device such as an outlet mode switching device of the vehicle air conditioner.

Such change and modification are to be understood as being within the scope of the present invention as defined by the appended claims.

What is claimed is:

1. A link mechanism for transmitting a driving force from a driving source to a driven unit, the link mechanism comprising:
    a first link disposed to be movable by the driving force from the driving source;
    a second link operatively linked with the first link in a connection portion to move the driven unit, wherein:
        in the connection portion, one of the first link and the second link includes a cam groove having a bent portion which is bent by a radius of curvature smaller than a predetermined value, and the other one of the first link and the second link includes a pin slidable within the cam groove; and
        the pin is disposed to be slidable in the cam groove with a sliding speed, the sliding speed of the pin is set lower when the pin slides within the cam groove by a predetermined amount, as compared with the sliding speed before the pin slides in the cam groove by the predetermined amount.

2. The link mechanism according to claim 1, wherein the first link is driven, so that the sliding speed of the pin is set lower when the pin enters into the bent portion, as compared with the sliding speed before the pin enters into the bent portion.

3. The link mechanism according to claim 1, wherein the first link and the second link are connected in the connection portion, so that the sliding speed of the pin is set lower when the pin enters into the bent portion, as compared with the sliding speed before the pin enters into the bent portion.

4. The link mechanism according to claim 1, wherein:
the sliding speed of the pin is set to be reduced to an approximate half when the pin enters into the bent portion, as compared with the sliding speed before the pin enters into the bent portion.

5. The link mechanism according to claim 1, wherein the radius of curvature of the bent portion on an inner radial side is equal to or smaller than 8 mm.

6. The link mechanism according to claim 1, further comprising:
a third link driven by the driving source to drive the first link,
wherein the third link is operatively linked to the first link.

7. A link mechanism for transmitting a driving force from a driving source to a driven unit, the link mechanism comprising:
a first link;
a second link operatively linked with the first link to move the driven unit; and
a third link driven by the driving force from the driving source to drive the first link, wherein:
in a connection portion between both the first and second links, one of the first link and the second link includes a first cam groove having a bent portion which is bent by a radius of curvature smaller than a predetermined value, and the other one of the first link and the second link includes a first pin slidable within the first cam groove; and
in a connection portion between both the first and third links, one of the first link and the third link includes a second cam groove, and the other one of the first link and the third link includes a second pin slidable within the second cam groove;
the second cam groove has first and second operation groove parts in which the first link operates in accordance with a rotation of the third link, and an idling groove part positioned between the first and second operation groove parts, the idling groove part having the radius of curvature approximately equal to that of a locus pictured by the second pin between the first and second operation groove parts; and
the idling groove part is set to approximately correspond to a timing where the first pin enters into the bent portion.

8. The link mechanism according to claim 7, wherein the first pin is disposed to be slidable in the first cam groove with a sliding speed, the sliding speed of the first pin is set lower when the pin enters into the bent portion, as compared with the sliding speed before the first pin enters into the bent portion.

* * * * *